United States Patent [19]
Kirsch

[11] 4,178,011
[45] Dec. 11, 1979

[54] TAPERED FIT COUPLING METHOD AND APPARATUS

[76] Inventor: John G. Kirsch, 2600 Old Ranch Rd., Carson City, Nev. 89701

[21] Appl. No.: 770,566

[22] Filed: Feb. 22, 1977

[51] Int. Cl.² .............................................. B60D 1/14
[52] U.S. Cl. .................................................... 280/477
[58] Field of Search ................ 280/477, 478 R, 478 B

[56] References Cited
U.S. PATENT DOCUMENTS

| | | | |
|---|---|---|---|
| 1,730,077 | 10/1929 | Isachsen | 280/477 |
| 2,150,010 | 3/1939 | Solomon | 280/477 |
| 2,170,983 | 8/1939 | Adams | 280/478 R |
| 2,753,192 | 7/1956 | Davis | 280/477 |
| 3,761,113 | 9/1973 | Smitherman | 280/478 R |

FOREIGN PATENT DOCUMENTS 992376  9/1976  Canada .............................. 280/478 B Primary Examiner—Joseph F. Peters, Jr.
Assistant Examiner—Randall A. Schrecengost
Attorney, Agent, or Firm—Herbert C. Schulze

[57] ABSTRACT

This is a unique tapered fit coupling arrangement for coupling a load to a power means, such as a trailer to a self propelled vehicle, wherein movement is allowed in all directions for coupling to allow for ease of hook-up, and wherein the device is characterized by a tapered female member with a corresponding tapered male member which can be inserted and drawn into firm and complete tapered fit to completely engage the power means and the load in a safe and compact relationship.

4 Claims, 13 Drawing Figures

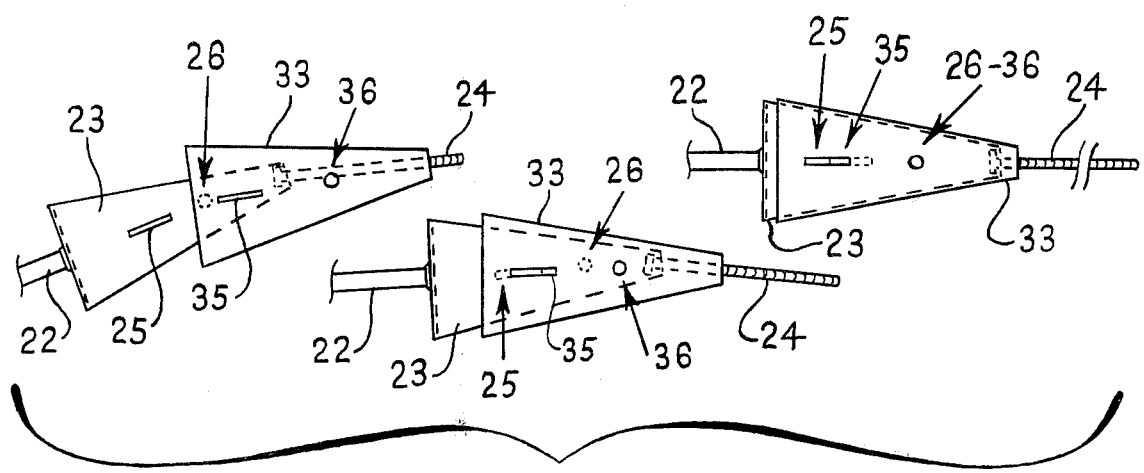
FIG. 4
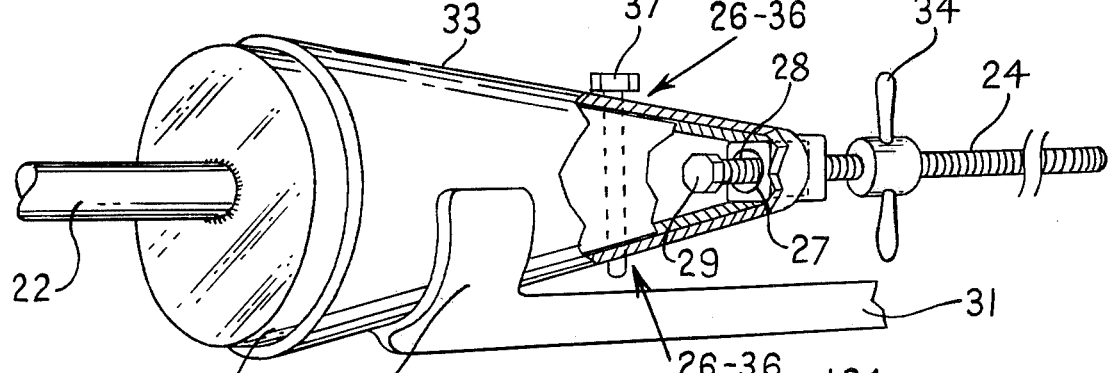
FIG. 5
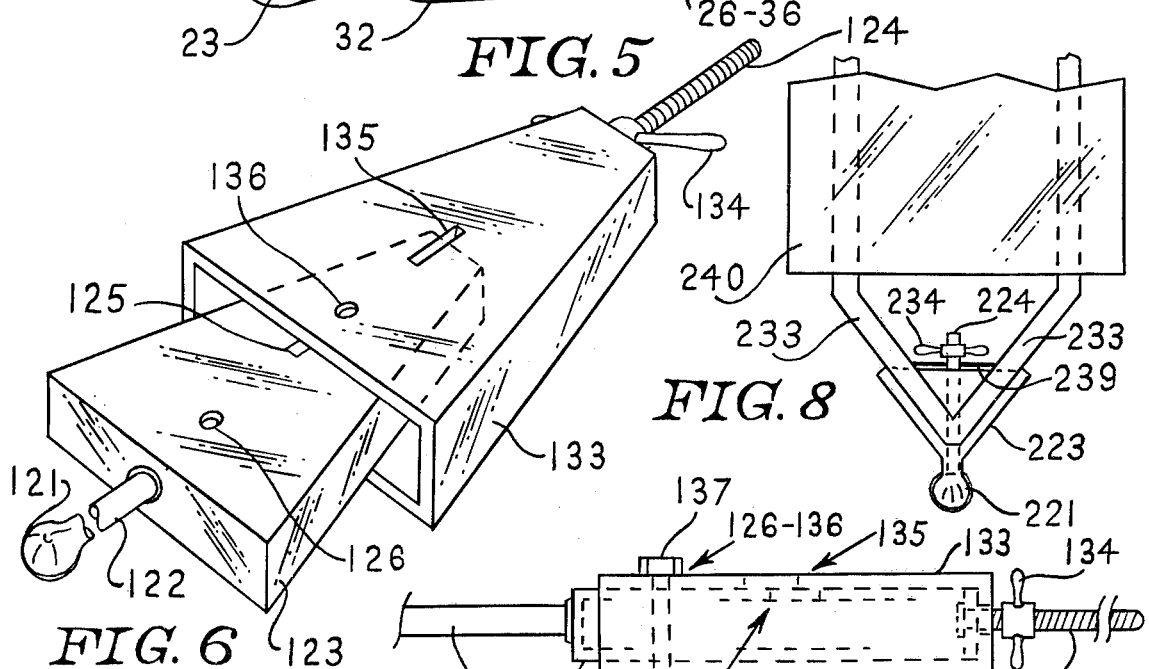
FIG. 6
FIG. 8
FIG. 7

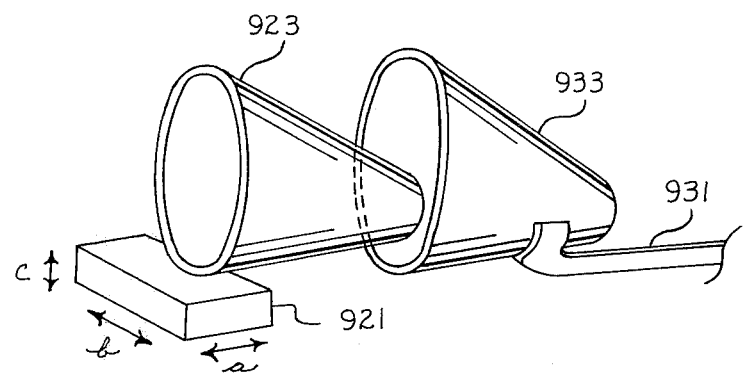
FIG.9
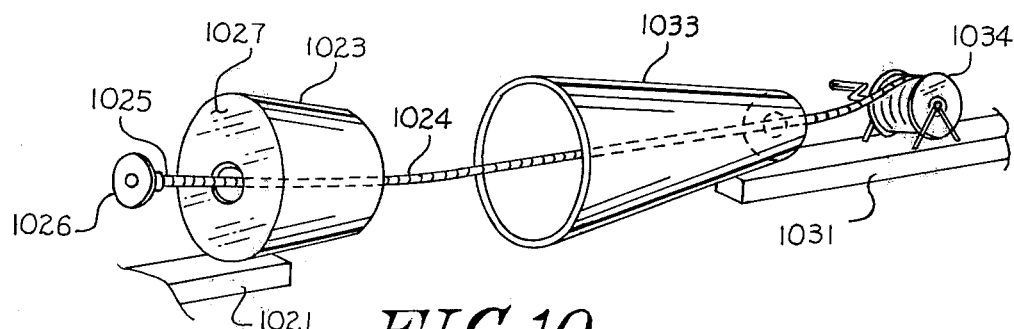
FIG.10
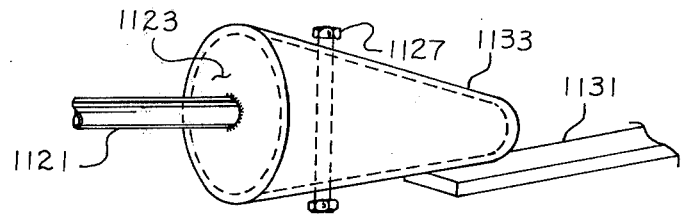
FIG.11
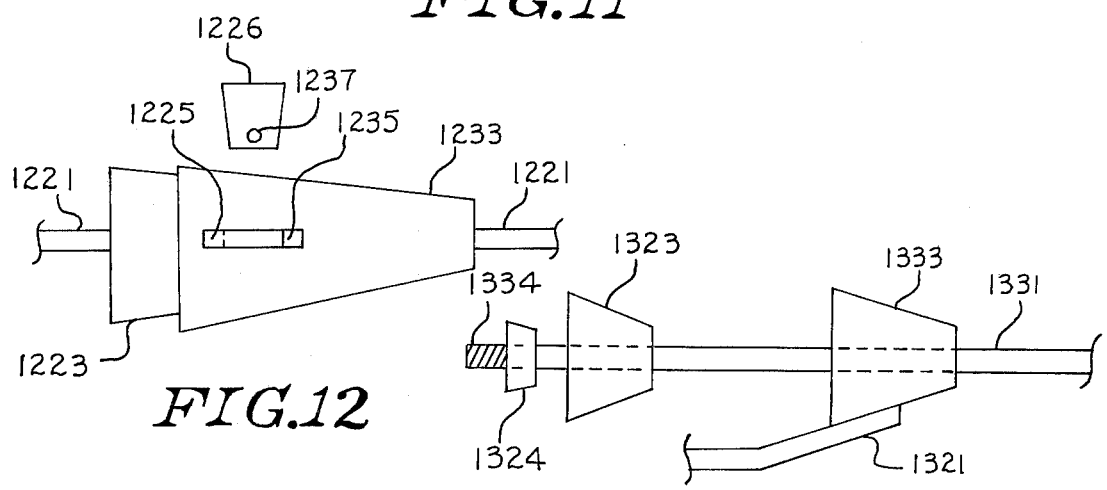
FIG.12
FIG.13

TAPERED FIT COUPLING METHOD AND APPARATUS

CROSS REFERENCE TO RELATED PATENT APPLICATIONS

There are no patent applications filed by me related to the present application.

BACKGROUND OF THE INVENTION

1. Field of the Invention

This invention is in the general field of coupling devices, and is more particularly directed to a coupling device which can couple a load to a power means wherein the load and power means may be hooked together in such manner as to allow free movement in all directions, yet with simplicity and great flexibility of hook-up, and wherein the point of connection consists of a tapered plug and socket which can be fitted together loosely and drawn into a positive and inflexible fit for actual power application. This is particularly adapted to the pulling of a trailer by an automotive vehicle or the like.

2. Description of the Prior Art

There have been numerous devices conceived and developed for connecting a load and a power means together. Perhaps the widest range of articles in this field is in the automotive field wherein various trailer hitches and the like have been used for such purposes. Such hitches customarily may be of a ball and socket type, a simple hinge-pin device, yoke and pintle devices, and numerous other connections including simple cables and the like, much two numerous to mention, but known to those skilled in the art.

Except for such items as cables and the like, hitches or connections between the load and power means are generally totally inflexible within themselves and rely upon an hinge-pin, a fixed ball and socket position, or some other such arrangement. Totally flexible arrangements such as a cable or the like are totally unsuitable for drawing most trailers by automotive vehicles and in similar situations.

I have now developed a combination with a customary hitching arrangement, such as ball and socket, or any other such arrangement, wherein a pair of cones or other tapered shapes are pulled into intimate contact with one another in such manner that they can be totally flexibly united in their inception and drawn into an absolutely tight and rigid fit for utilization as trailer tongue or the like. In this sense, there is no prior art known to me, and particularly there is no prior art known utilizing a pair of matching male and female tapered members in which a positive and inflexible fit can be achieved.

SUMMARY OF THE INVENTION

There are numerous applications of vehicles or power units which are connected to a non-powered load by a device frequently called a "hitch". Most frequently such devices are used in the automotive field wherein a truck, for example a simple pick-up truck, will be required to tow behind it a trailer such as for example a two-wheeled general cargo trailer. Customarily in such instances, the truck will be equipped with a device such as a ball-type element attached to and extending from the rear of the truck. The trailer tongue will be equipped with a device, such as a socket, normally having a cooperative element such that the socket slips over the ball, and the cooperative element is fastened beneath the socket and on the under side of the ball in such manner that the socket cannot escape until this cooperative element is released.

There are many other types of trailer hitches, including such simple devices as a pair of interlocking yoke-like elements in which a bolt is slipped through cooperative holes to provide for a flexible towing element.

All of the devices utilized, as above mentioned, have the common fault and deficiency that it is difficult, particularly with a heavy and loaded trailer, to properly align the two elements of the hitch and have them fit together in a safe relationship. Such deficiency results in many injuries and much loss of time.

I have given considerable attention to this problem, and I have now developed a new connecting device to be utilized between a power means such as a truck and a load such as a trailer. My new device utilizes an interesting combination with the tongue attached to the trailer and the hitch attached to the truck, of tapered elements capable of being drawn into intimate and rigid contact with one another between the tongue and the hitch.

The tapered elements can take many forms, one of the most desirable of which is a cone-shaped form for two such tapered elements, one of which fits inside of the other. The principle applied will be the same regardless of the exact shape the tapered elements take, and in a description of a preferred embodiment which follows, I will illustrate more than one possibility, but it is understood that the same principle applies to all such tapered elements fitting together.

By the utilization of a cone-like tapered element, or similar device, one element can fit within the other with a wide range of initial contact direction, not possible with the usual hitch. The two cones can be aligned from an initial position in which there is a great angular difference in any direction between the truck and the trailer.

For example, a truck can be elevated from, and at a lateral distance from, a trailer and my device will allow the two to be brought into intimate contact and pulled together without any maneuvering of any nature on the part of the truck or the trailer. Likewise, directional differences could be in any other direction conceivable provided only that they come within the limits of the cone differentials as will be explained in the description of a preferred embodiment and as will be understood by those skilled in this art.

In utilization, the truck will have a hitch, such as a ball and socket type hitch, with the socket located upon the ball and a cone extending outwardly from the socket, with a cone attached to the tongue of, or otherwise attached to, a trailer, and with a pilot shaft or the like suitable to draw the tongue and the hitch ends together into a totally intimate mating relationship. Utilizing the principle of a pair of tapered cones, one fitting within the other, it will be clear to those skilled in the art that a solid connection is then made between the trailer and the truck hitch, with the only movement being the movement allowed at the hitch by the action of the ball and socket arrangement, or other pivot point.

It is an object of this invention to provide an improved method for connecting a load to a power means, wherein the principle of a pair of connecting elements is utilized as an element of the connection so that initial connection can be at a wide variety of angle and dimensional displacement between the two elements and wherein the final result is a rigid connection.

Another object of this invention is to provide an improved trailer or other connecting device utilizing elements to practice the method of the forgoing object.

Another object of this invention is to provide such a method and device wherein a motive power and a load can be connected together even though considerably out of line dimensionally and directionally before being joined.

The forgoing and other objects and advantages of this invention will become clear to those skilled in the art upon reading the following description of a preferred embodiment in conjunction with a study of the appended drawings.

BRIEF DESCRIPTION OF THE DRAWINGS

FIG. 4 illustrates the same device of FIGS. 1, 2, and 3 in different scale, and with three positions showing the situation from initial contact to final to final joinder with the addition of a safety pin arrangement and knock-out slots for disengaging the elements after use;

FIG. 5 is an enlarged perspective of the coupling elements in complete contact with the exception of the pilot and clamping rod and nut;

FIG. 6 is a perspective of an alternate embodiment of an apparatus to practice the method of this invention;

FIG. 7 is a side elevation of the apparatus of FIG. 6;

FIG. 8 is a top elevation of another alternate embodiment of an apparatus to practice the method of this invention;

FIG. 9 is a schematic perspective, broken away, of an alternate embodiment of this invention;

FIG. 10 is a schematic perspective of still another potential embodiment of an apparatus to practice this invention;

FIG. 11 is a schematic perspective, partially broken away, of still another alternate embodiment of an apparatus to practice this invention;

FIG. 12 is still another schematic plan view of an alternate embodiment of an apparatus to practice the method of this invention; and FIG. 13 is a schematic side elevation of still alternative of an apparatus to practice the method of this invention.

DESCRIPTION OF A PREFERRED EMBODIMENT

Figure 1:
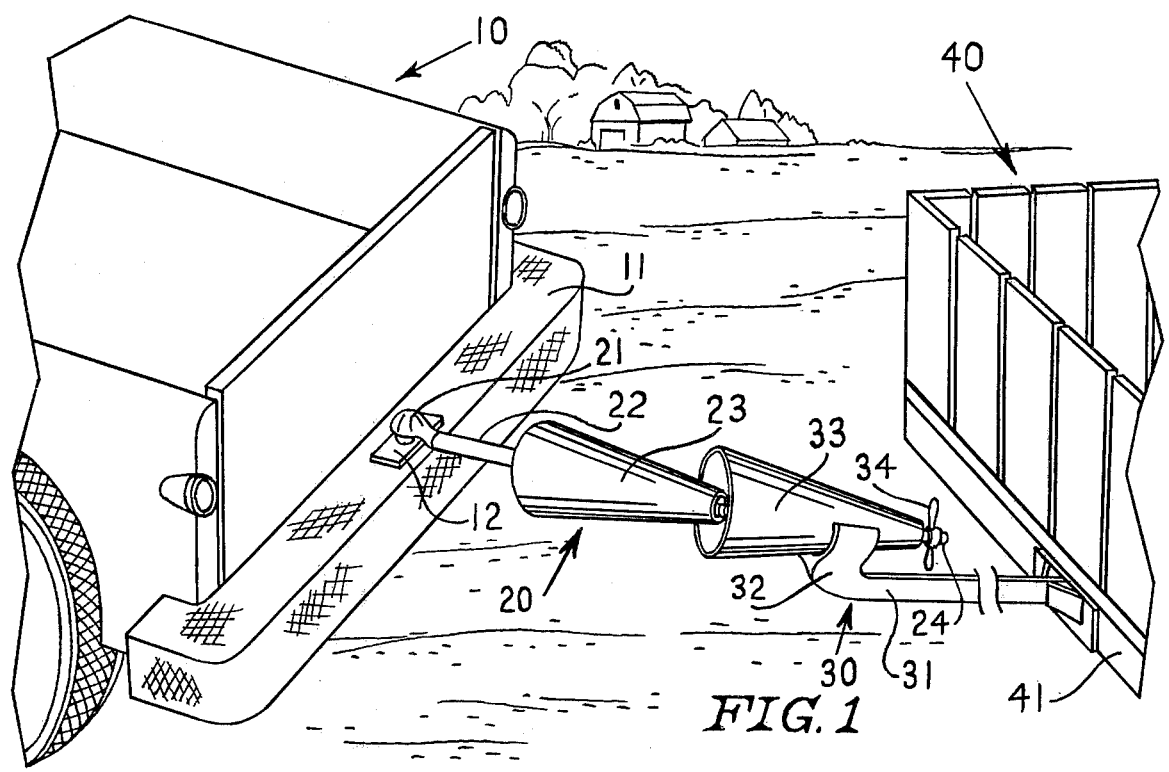
FIG. 1 is a partially broken away perspective of a truck and trailer being connected from a severely misaligned position, utilizing the method and apparatus of this invention.

FIG. 1 illustrates the common situation of a truck generally 10, having a hitch, such as a ball-type hitch of customary construction 12, attached to the frame or bumper 11. A trailer generally 40 is to the rear of the truck and it has a tongue 31 attached to a frame 41 in a customary manner. The general male tapered cone-like element 20 and female tapered cone-like element 30 are illustrated in an initial position of misalignment between the trailer and the truck. In this case, a pilot shaft 24 is shown extending from male cone element 23 through an opening in the rear of female cone element 33. A wing nut or the like 34 is engaged upon the threaded pilot shaft 24. The male cone element is shown to be attached to shaft 22 which carries socket arrangement 21 connecting to the ball arrangement 12.

The female cone element 33 may be connected by a carrier such as 32, welded or otherwise suitably fastened, and depending from the tongue 31.

At the position shown in FIG. 1, it will be clear that considerable misalignment has existed and that from a distance of considerable dimension, initial pilot contact has been made between the truck 10 and the trailer 40.

Figure 2:
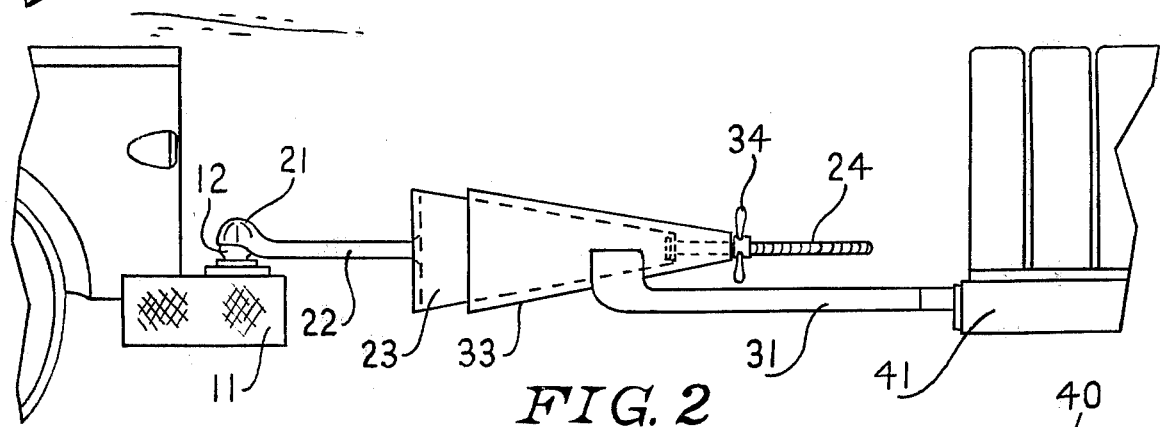
FIG. 2 is a side view of a truck and trailer of FIG. 1 in which the truck and trailer have been drawn into a more close association, but not completely coupled.

Turning attention to FIG. 2, the same elements are illustrated from a side position and after the two units have been drawn into a somewhat more close relationship. It will be noted that the cone 23 has now been drawn into a position of a very near direct alignment inside the cone 33, with the wing nut or the like 34 now drawing the pilot rod 24 in such a manner that the two cone elements will ultimately be in intimate contact.

Figure 3:
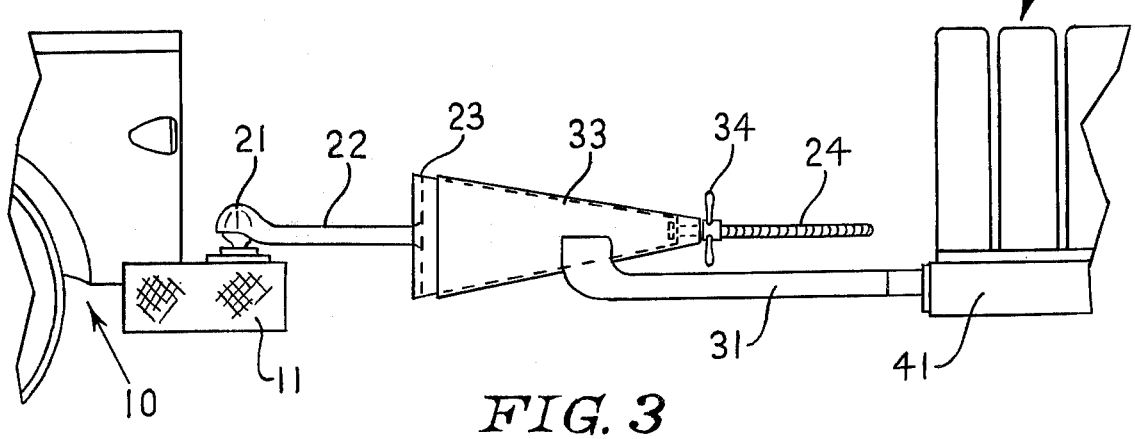
FIG. 3 is the same view as FIG. 2 except that the apparatus is now fully and completely engaged.

FIG. 3 shows this latter mentioned situation of intimate contact between the cones 23 and 33. Nut 34 is now tight upon the rod 24, and it will be noted that there is now a completely rigid connection from the socket 21 through the tongue portion 22, the two cone portions 23 and 33, and the tongue 31. Thus, it will be understood that from a position of total flexibility and misalignment between the two vehicles, a firm rigid and totally inflexible joint is now made in the two portions of the overall tongue from socket element 21 through to the trailer frame 31 by means of the element illustrated.

FIG. 4 consists of three individual illustrations of the same elements as shown in FIGS. 1, 2, and 3, and going through three different positions, and for the specific and express purpose of showing how the misalignment from inception to complete alignment and rigid connection at the end is accomplished. Additionally, FIG. 4 has shown alternate features comprising the elements 25, 26, 35, 36, which will be described in more detail below as to their function. In the study of FIG. 4, reading from left to right, there is shown first a complete misalignment of the cone elements 23 and 33. The pilot threaded rod 24 is able to move with relation to cone element 33 by means of an enlarged hole in an end plate as is illustrated in more detail in FIG. 5, and will be discussed below.

The slots 25 and 35 are so arranged as to come into alignment with one another and the two slots will overlap one another as illustrated in the right hand figure where the elements are in complete contact. It will be noted that the nut 34 has not been shown in position here, and that is only for clarity of view. In actual operation the nut will be in position as shown in the forgoing figures.

By the use of a drift pin, when the cones are in complete and intimate contact, the cones may be separated in case they should bind by driving the drift pin into the offset slots 25-35 as will be known to those skilled in the art.

The holes 26 and 36 have been provided to come into complete alignment so that a safety pin or the like may be inserted as will be described in FIG. 5 which is discussed below.

FIG. 5 illustrates clearly the various features of the device including the safety pin arrangement. In FIG. 5 the two cone elements are shown in complete alignment and in final intimate contact with one another. In this case, the pin element 37 is shown through the aligning holes 26-36. The nut 34 is shown disengaged and the rod 24 is shown loose in order to explain the aligning of the rod in its initial stages. It will be noted that the plate 27 closing the end of male element 23 is provided with an enlarged hole 28. The rod 24 has an enlarged hood or end 29. Thus, in the initial alignment as shown in FIG. 4 and some of the other figures, the rod 24 is able to move laterally with relation to the direction of the axis of cone 23 so as to provide the complete assembly as shown and heretofore described.

FIG. 6 shows an alternate embodiment of the same principle as heretofore utilized. In this case, the tapered elements take an entirely different shape as is illustrated, and tapered element 123 corresponds to tapered element 23 in the forgoing illustrations. Likewise, tapered element 133 corresponds to tapered element 33 previously shown, and the rod 124 functions in a like manner to rod 24, with nut 134 functioning like nut 34 previously described.

The element 133 will be attached to an appropriate trailer tongue or the like (not illustrated in FIG. 6) and the element 123 will be attached to a socket arrangement 121 through connecting rod 122. Safety pin holes 126–136 may be provided to be utilized in a manner similar to the holes 26–36 of the previous embodiment, and the drift pin slots 125–135 will function in a similar manner to slots 25–35 of the illustration of FIG. 4.

FIG. 7 shows the embodiment of FIG. 6 from the side and when fully assembled. In this case, the trailer tongue 131 is shown welded or otherwise connected beneath the element 133, and the elements 123 and 133 are shown in intimate contact, with the nut 134 on the pilot rod 124 being backed off for purposes of clarity of illustration. The safety pin 137 is shown in position in the aligning holes 136 and 126, and the two slots 125 and 135 are illustrated in phantom so that one will understand how a drift pin will knock the elements clear.

One additional embodiment having some unusual values and characteristics is illustrated in FIG. 8. In this case, the socket arrangement 221, which will connect to a ball on a truck or the like by means known to those skilled in the art, is illustrated as being connected to a "V"-shaped socket element 223 which becomes the female element in this case. The male connecting element 233 comprises a pair of members angularly disposed and connected as shown. The powered rod 224 and the nut 234 are shown as well as a frame member to cooperate with the nut 234 shown at 239. In this case, trailers, already constructed with a tongue fastening arrangement of the nature 233, may be hooked up safely, quickly and from misalignment in a new and unusual fashion by utilizing the socket arrangement 223 in connection with the trailer hitch 221.

FIG. 9 shows a different embodiment incorporating at least two different features of an embodiment to practice the method of this invention. In this case, it will be noted that the cones 923 and 933 are basically elliptical in shape. The cone 923 is fastened appropriately to an hydraulically operated mounting 921 which can be hydraulically moved in all directions as shown by A, B, and C. This type mounting (the hydraulic activation) is common on hitches for tractors, and allows a shifting for various purposes in various directions.

By mounting cone 923 in this manner directly to that element, and by directly mounting cone 933 to the tongue 931, or for that matter, directly to an implement such as a disc or the like, the tractor may be backed up to the implement and cone 923 backed directly into position. The power shaft has not been shown here, nor has the connecting pin, but it is to be understood that by connecting pins, pilot shafts, or any of the other connecting arrangements shown heretofore or in the following illustrations, a complete coupling will be obtained.

FIG. 10 illustrates yet another embodiment, wherein the tapered element 1023 is fastened directly to the towing bar 1021, and the tapered element 1033 is fastened to the tongue 1031 of an appropriate vehicle. Mounted on the tongue 1031 will be a winch or the like 1034, carrying a cable 1024 which will have an appropriate means, such as a threaded rod or the like 1025 at its end, and a nut, pin, or other device 1026 can be fastened to the cable in order to hold it firmly against a solid end plate affixed to this particular embodiment, as an alternative, as shown at 1027. Thus, from a considerable distance, the two vehicles can be pulled together. It is not necessary that the winch be located, of course, in this manner, and, in fact, the entire situation could be reversed where the cable was attached to the towing vehicle, and the connection would be through the other end of the tapered element 1033 in a manner which will be understood by those skilled in the art.

FIG. 11 shows an alternate to the previous embodiments wherein cone 1123 is fastened to pulling shaft 1121, with the matching element 1133 fastened to tongue 1131. A pin, bolt, or the like 1127 will be placed through matching holes in the two tapered elements, which holes are not shown, but will be understood by those skilled in the art. In this case, the tractor or the like attached to element 1121 can force cone or other tapered element 1123 into position within tapered element 1133 so that the holes are in alignment, and then this pin or bolt is inserted.

An alternate to the arrangement of FIG. 11 would be accomplished by having off-set slots as indicated in FIG. 12. In this case, the towing bar 1221 is fastened to cone 1223, and cone 1233 is fastened to tongue 1221. Slot 1225 is shown to be offset with relation to slot 1235, and a tapered pin or the like 1236 can be utilized to drive the two elements into a tight wedged connection. The hole 1237 in the bottom of the pin can be utilized for placement of a bolt or the like to secure the pin from working loose during transport. This will be understood by those skilled in the art.

An extremely interesting embodiment is shown in FIG. 13. In this case, an off-set tow bar 1321 or the like is welded or otherwise suitably connected to a tapered element 1333 which acts in the manner of the female of the two elements coming together. The male element 1323 is connected to the tongue or the like 1331 of the vehicle or the like being towed. Alternatively, the tongue 1331 may slip right through a hole in the end of element 1323, and a nut or the like 1324 (preferably tapered to fit the interior of tapered element 1323) may be connected by thread 1334 or the like, as will be understood by those skilled in the art, to the end of tongue 1331. In this case then, when the tapered elements come together they will be in fixed arrangement and cannot pull loose.

In the final embodiment shown in FIG. 13, it is to be understood that the passage through the end of element 1333 will be large enough to permit out-of-line initial connection, if desired.

In understanding the method and apparatus of this invention particularly since I have made many different embodiments, it is necessary that it be kept in mind that where a vehicle and trailer have been utilized, it is understood that any power or pulling device may be connected to one side of a tapered fit element and the trailing or pulled device may be connected to the other side. It is not necessary that one or the other be the pulling device in the exact manner in which these various embodiments have been shown. It is particularly important to note that the matching male or female elements, or the interior and exterior elements, or the mating tapered fits, can be reversed to either side so that it makes no difference which way they have been shown. This will be clear to those skilled in the art.

Numerous other modifications will be clear to those skilled in the art, and a few of those should be mentioned rather simply. It should be noted that the pins shown for fastening the tapered elements together could be spring loaded or otherwise particularly attached; not only can the tapered elements be pulled together, but they can be pushed together by reversing the truck or other pulling device; The tapered portions can be connected directly to the vehicle, can be connected to plates at either ends, and in numerous other manners as will occur to those skilled in the art.

It also is worthy of note that in caster wheel trailers and the like, and possibly in other applications, it may be desired to not have any ball, or other type hitch, at the vehicle since a direct connection of the two tapered elements may be more desirable.

It is further to be understood that the method of coupling the vehicle and/or load pulling device and the load itself is not of consequence. The teaching of this invention is the use of the tapered elements to bring the load and the pulling element into intimate contact regardless of how they are connected at a ball and socket arrangement, a hinge pin arrangement, or whatever the coupling between the units may be.

The essential element and teaching set forth is that intermediate the two elements of transport (the power element and the towed element) there is the tapered contact and connection which draws the two elements into a connection normally thought of as compressive, but now actually somewhat in a tensile position. The purpose of this teaching and method and apparatus must be kept in mind, and that is to join the two elements from a position of severe misalignment and yet pull them into contact such that there is a rigid bar between the two elements (the load and the power element).

The embodiments of this invention shown and disclosed are fully capable of achieving the objects and advantages desired, but it is to be understood that such embodiments have been illustrated solely for illustrative purposes and not for purposes of limitation.

I claim:

1. Apparatus for coupling a load to a power unit comprising: (1) A first tapered element containing a drift pin slot connected to the power unit; (2) A second tapered element containing a drift pin slot, partially alignable with the drift pin slot in the first tapered element so that a drift pin may be inserted through the two partially aligning drift pin slots for purpose of separating the two tapered elements when they are in contact with one another, connected to the load; (3) A misaligning pilot shaft between the two tapered elements; and (4) Means upon the misaligning shaft to draw the two tapered elements into intimate and rigid contact.

2. The method of coupling a power unit to a towed unit comprising: (1) equipping the powered unit with a depending element comprising in part a tapered device; (2) equipping the towed unit with a depending element comprising in part a tapered device suitable to engage the tapered device on the power unit; (3) providing a pilot shaft connected to one of said tapered devices in such manner as to be insertable through the other tapered device; (4) joining the two tapered devices in contact with one another with the same pilot shaft connected to one and extending through the other of said tapered devices; and (5) fastening said pilot shaft to said other tapered device.

3. The method of claim 2 wherein each of the tapered elements is in the shape of a cone, one fitting into the other.

4. The method of claim 2 wherein each of the tapered elements is in the form of a "V".

* * * * *